United States Patent [19]

Hicks

[11] 3,760,529

[45] Sept. 25, 1973

[54] LIVE BAIT HOLDER
[76] Inventor: Thomas W. Hicks, 3121 Maple Dr., N.E. Suite 23, Atlanta, Ga. 30305
[22] Filed: Aug. 6, 1971
[21] Appl. No.: 169,636

[52] U.S. Cl.................... 43/41, 43/42.11, 43/44.4
[51] Int. Cl............................................ A01k 97/08
[58] Field of Search.................... 43/44.4, 41, 41.2, 43/42.11

[56] References Cited
UNITED STATES PATENTS

| | | | |
|---|---|---|---|
| 2,476,553 | 7/1949 | L'Huillier | 43/41 |
| 3,193,965 | 7/1965 | Jacobsen | 43/44.4 |
| 2,840,945 | 7/1958 | Sealock | 43/41.2 |
| 2,260,705 | 10/1941 | Eguchi | 43/41.2 |

Primary Examiner—Russell R. Kinsey
Assistant Examiner—Daniel J. Leach
Attorney—Harold D. Jones Jr. et al.

[57] ABSTRACT

A holder for live bait having a flexible shell defining a cavity sized and shaped to receive the forward two-thirds portion of a bait fish such as a minnow or the like. The opening at the rear portion of the holder is oblong, and a slot extends from the opening along the top or back of the holder. The bait is inserted into the holder by compressing the top portion of a holder towards its bottom portion to widen the rear opening and slot so that the thicker forward body portion of the bait can pass into the shell. Openings are provided in the shell for the fins or other appendages of the bait, serving to confine the bait in the holder and allowing the bait to swim while confined in the holder.

16 Claims, 8 Drawing Figures

PATENTED SEP 25 1973 3,760,529

INVENTOR
THOMAS W. HICKS

BY *Jones & Thomas*
ATTORNEY

LIVE BAIT HOLDER

BACKGROUND OF THE INVENTION

When fishing for game fish the best possible bait is usually live bait. The natural motion of the live bait seems to attract the game fish more frequently than the various artificial lures and other bait. Also, live bait that is injured seems to attract the game fish more frequently than uninjured live bait, apparently since the injured bait cannot escape as easily.

While various devices have been developed in an attempt to attach, confine or somehow connect live bait to a fishing line, the devices usually have either caused the bait to die soon after its attachment to the device, or to impede the motion of a bait in the water so that the bait does not retain its ability to swim, etc., and does not attract the game fish.

SUMMARY OF THE INVENTION

Briefly described, the present invention comprises a holder for live bait which enables live bait to be connected to a fishing line, together with the desirable hooks and other devices, whereby the movement of the bait is not so restrained that the bait cannot swim and the holder does not kill the bait. The holder comprises a flexible shell which defines a cavity sized and shaped to receive the front part of a live bait fish or the like. A tail opening in the shell is provided so that the tail of the bait fish extends through the opening and is left free to enable the fish to swim while confined in the shell. In addition, openings are provided for the dorsal, pectoral and pelvic fins of the fish, which further enables the fish to swim normally, and which functions to confine the fish in the shell. Hooks are connected to the shell in various arrangements so as to impale the game fish that attempts to take the bait fish. In one embodiment of the invention a bubble is connected to a rear upper side portion of the shell so as to cause the shell and the fish confined therein to float in a tilted nose-down attitude, causing the fish to struggle to attain its normal attitude. This causes the fish's tail to slap the surface of the water and attract the game fish.

Thus, it is among the objects of the present invention to provide a holder for live bait for connecting live bait to a fishing line without entirely impeding the ability of the bait to swim or otherwise move in the water.

Another object of this invention is to provide a live bait holder for bait fish or the like which allows the bait fish to be connected to a fishing line without killing the fish or substantially impeding the ability of the fish to swim or otherwise move in the water and attract game fish.

Other objects, features and advantages of the present invention will become apparent upon reading the following specification, when taken in conjunction with the accompanying drawing.

DESCRIPTION OF THE PREFERRED EMBODIMENTS

Figure 1:
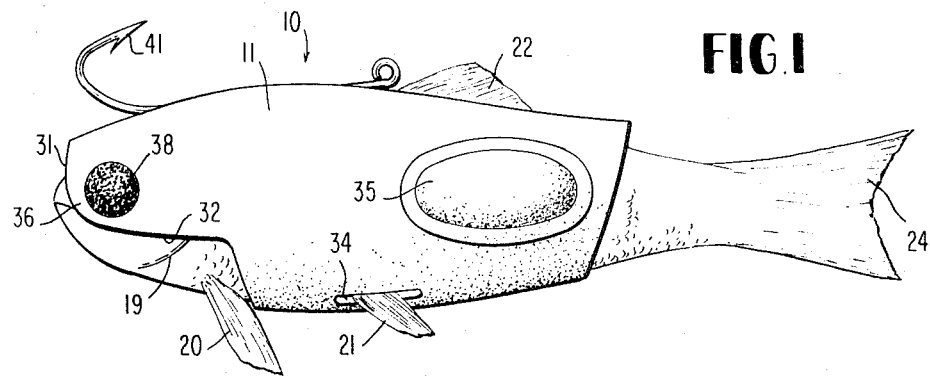
FIG. 1 is a side view of the bait holder with a minnow inserted in the holder.
Figure 2:
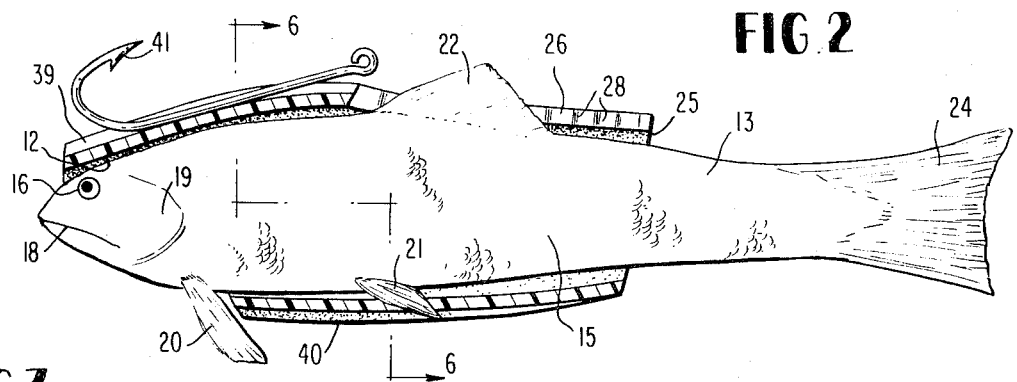
FIG. 2 is a side cross-sectional view of the bait holder and the minnow.

Referring now in more detail to the drawing, wherein like numerals indicate like parts throughout the several views, FIG. 1 disclosed bait holder 10 which comprises a housing or shell 11 fabricated from a thermoplastic such as polystyrene. Shell 11 defines an internal cavity 12 which is sized and shaped in accordance with the bait 13 which is to be received in and retained by the shell. The particular bait disclosed in the drawing is a minnow 13 having a body portion 15, eyes 16, mouth 18, gills 19, pectoral fins 20, pelvic fins 21, dorsal fin 22, and tail or caudal fin 24. The body 15 of a minnow is thicker at its area immediately behind its gills 19 and begins to taper inwardly toward its tail 24 to become thinner beginning at about the beginning of its dorsal fin 22. Also, the height dimension of the minnow is tapered inwardly from the area of the dorsal fin toward the tail so that the fish is usually largest in the area at and forwardly of the dorsal fin.

The internal cavity of shell 11 generally conforms in size and shape to the forward two-thirds of the minnow 13 and defines a tail opening 25 at its rear end so that the tail and rear body portion of a minnow confined in the shell can protrude from the shell and move freely, enabling the fish to swim while confined in the shell.

Slot 26 extends from tail opening 25 forwardly along the top of shell 11 and terminates at a position which is usually slightly forward of the dorsal fin position of a minnow properly positioned in shell 11. The dorsal fin 22 of the minnow normally will be received in slot 26, so that the dorsal fin 22 protrudes through the slot. Protrusions such as corrugations 28 are formed in the side walls of slot 26 so that they face inwardly of the slot. The protrusions 28 tend to cling to the dorsal fin 22 of a minnow and prevent the dorsal fin from moving rearwardly through the open end of the slot.

Figure 3:
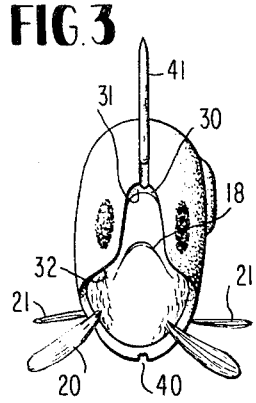
FIG. 3 is a front view of the bait holder with the minnow inserted therein.
Figure 4:
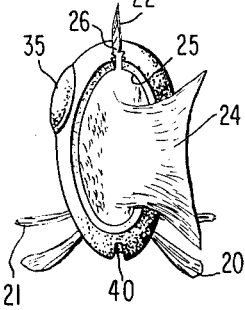
FIG. 4 is a back view of the bait holder and minnow.

Shell 11 also defines a front or mouth opening 30 (FIG. 3) which is aligned with the mouth 18 of a minnow which is properly positioned within the cavity of the shell 11. Front opening 30 includes an upper portion 31 which is a relatively narrow width, and a lower wider portion 32 which exposes the lower front of the body of the minnow. The lower extremity of the gills 19 and the pectoral fins 20 are exposed through the lower portion 32 of front opening 30, and the fish is able to take water in its mouth and expel water through its gills by means of this opening. In addition, the pectoral fins 20 are able to function normally because of their exposure through the lower portion 32 of front opening 30. Since the front opening 30 is smaller than the minnow, the minnow is not able to swim through the front of the shell.

Lower pelvic fin openings 34 are located in the lower portion of shell 11 and are sized and positioned to receive the pelvic fins 21. The pelvic fins normally will extend from the minnow in the cavity of shell 11 through the shell and be able to function, at least to a limited amount, in the normal swimming movements of the minnow.

Air blister 35 is attached to shell 11 at a rear portion thereof and to one side thereof. The air blister functions as a buoyant means and tends to cause shell 11 and the minnow confined therein to float in a tilted, tail-up attitude. Of course, blister 35 is formed in a size which is gauged to impart the proper buoyancy for the size minnow which is to be confined in shell 11.

The front portion of shell 11 at front opening 30 forms a hood 36 that extends on opposite sides of the face of the fish, over the eyes 16 of the fish. Shell 11 will usually be fabricated of transparent material so that the color and body features of the fish can be viewed through the shell, and the portions of the shell which will extend over the eyes of the minnow are coated with a bright opaque material 38 so as to blind the fish and to attract the game fish to the bait fish.

Figure 6:
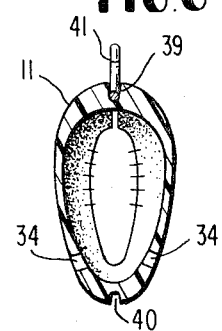
FIG. 6 is a cross-sectional view of the bait holder, taken along lines 6—6 of FIG. 2.

The wall of shell 11 is thicker along its top and bottom portions than along its side portions (FIG. 6), and grooves 39 and 40 are formed along the length of the shell in the top and bottom walls, respectively. Grooves 39 and 40 are for the placement of the shank portion of hooks, such as hook 41. The hook 41 can be placed in the position shown in the drawing, with its sharpened end at the forward portion of shell 11 and with its eye adjacent the dorsal fin slot 26, or in the reversed position with the sharpened end adjacent the dorsal fin slot 26. Also, a hook can be inserted in the slot 40 at the bottom of shell 11, with the sharpened end at the front or at the rear portion of the shell. Normally at least one hook will be rigidly connected to the shell 11 by wedging the shank of the hook in one of the grooves or in both of the grooves 39 and 40 and by placing an appropriate cement over the shank of the hook.

Figure 8:
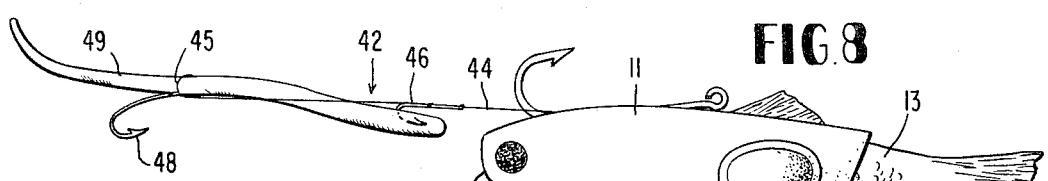
FIG. 8 is a side view of the bait holder with a minnow inserted therein, and a worm support means connected to the bait holder.
Figure 7:
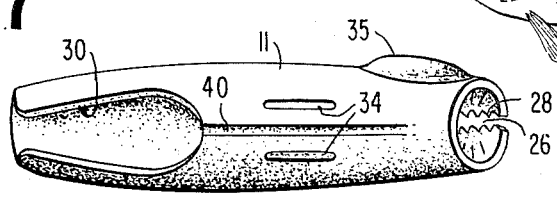
FIG. 7 is a bottom view of the bait holder.

As is illustrated in FIG. 8, a worm holder 42 also can be connected to the top groove 39. Worm holder 42 comprises an extension wire or leader 44 that extends out beyond the front of shell 11, a loop 45 in the leader 44, and hooks 46 and 48 at spaced intervals along the leader. A live or plastic worm or the like 49 can be connected to worm holder 42 by impaling one end of the worm 49 on hook 46 and threading the other end of the worm through loop 45. When a bait fish is inserted into the shell and a worm is connected to the worm holder, the arrangement will appear as if the bait fish is chasing the worm.

Figure 5:
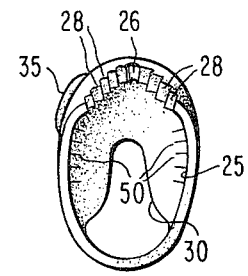
FIG. 5 is a back view of the bait holder, without the minnow, showing the rear opening of the bait holder expanded to receive the bait.

As is illustrated in FIG. 5, when the top and bottom rear portions of the shell 11 are compressed toward each other, the slot 26 which intersects the tail opening 25 will tend to spread so that the tail opening 25 expands in width. The increased width of the tail opening and the presence of the spread-apart slot 26 allows a bait fish 13 to be inserted into shell 11 through the tail opening 25 and slot 26. When the bait fish has been inserted into the shell, the shell can be released and it will spring back to its original position. Since the tail opening 25 is smaller in thickness and in height than the thickness and height of the typical bait fish, the bait fish will be confined in shell 11 by the narrow tail opening 25. In addition, protrusions 50, such as small spikes or ribs or corrugations, are imposed on the inside facing surfaces of shell 11 at tail opening 25 to impale the scales of the bait fish when the bait fish moves rearwardly with respect to shell 11. The protrusions 50 assure that the bait fish will not be allowed to move rearwardly through tail opening 25, even if the bait fish is a relatively small fish.

When the bait fish is received in shell 11 and the shell includes an air blister 35, the blister acts as a buoyant means and functions to lift or support the fish and shell in the water and raise the fish toward the surface of the water. If the fish is inactive for a short period of time, the buoyancy of the blister will cause the fish to reach the surface of the water in a tail-up, head down attitude and tilted on its side. Usually the normal bait fish attempts to right itself in the water when in this unusual attitude by wiggling its tail, etc., and when the fish's tail moves it tends to break the surface of the water and slap the water, thus attracting the game fish. Also, the bait fish will tend to struggle to maintain its normal swimming attitude against the buoyancy of blister 35, thus tending to attract the game fish to the struggling, apparently injured, bait fish. In addition, since the spots 38 of opaque material are applied to the transparent shell 11, the bait fish cannot see and therefore will not be able to swim to a protected area in the water.

The internal cavity 12 of the shell 11 is constructed to be slightly larger in its head area than the size of the head of the fish so that the gills 19 of the confined fish can function properly. Also, since the lower portion 32 of the front opening exposes the lower extremities of the gills, the water passing through the gills does not have to pass through the entire length of shell 11. Moreover, the pectoral fins 20 at the front of the fish function freely to assist the fish in its swimming movements, and once the fins 20 extend to the front opening, it is more difficult for the fish to back out of the shell since the fins 20 will impede the backward movement of the fish with respect to the shell. In addition, the pelvic fin openings 34 also tend to restrain the rearward movement of the fish with respect to the shell. Since the pelvic fins 21 cannot pivot to a forward position, these fins would have to be broken once they had been inserted through the openings 34 before they would allow the fish to move rearwardly with respect to the shell 11.

While blister 35 has been disclosed as an air blister to provide buoyancy to the shell 11, it should be apparent that various other buoyant means can be utilized to provide the proper buoyancy for the shell, including various plastics, cork material, etc., or by forming portions of the shell of low density material.

While the embodiment of the invention disclosed herein has been described as a holder for minnows, it should be obvious that the invention can be modified to accommodate other species of fish, including salamanders, shrimp and other fresh water and salt water creatures. Also, if the bait is to be used for deep fishing, the bait holder can be manufactured without air blister 35 or the air blister can be punctured to allow its air to escape. And while this invention has been described in detail with particular reference to a preferred embodiment, it will be understood that other variations and modifications can be effected within the spirit and scope of the invention as described hereinbefore and as defined in the appended claims.

I claim:

1. A holder for live bait fish comprising a resilient shell defining a cavity which generally conforms in size and shape to the front body portion of the fish and a tail opening at its rear end through which the tail of the fish normally protrudes, said tail opening being of a width smaller than the width of the cavity forward of said tail opening, and a slot defined in said shell and extending forwardly from said tail opening along the top of said shell so that when the top of said shell at its rear portion is compressed toward the bottom portion thereof the slot and tail opening spread wider to provide space large enough to admit the passage of the front body portion of a live bait fish into the shell and when the shell is not compressed the tail opening and slot are retracted to confine the fish in said shell.

2. The holder of claim 1 and wherein said slot extends forwardly along the top portion of said shell a distance sufficient to receive the dorsal fin of the fish.

3. The holder of claim 1 and wherein said slot extends forwardly along the top portion of said shell a distance sufficient to receive the dorsal fin of the fish, and wherein said slot includes inwardly facing protrusions along its surfaces for engagement with the dorsal fin of the fish.

4. The holder of claim 1 and wherein said shell comprises a mouth opening in the front portion thereof in alignment with the normal position of the mouth of the fish when a fish is properly positioned in said shell so that the fish can receive water through said mouth opening.

5. The holder of claim 1 and wherein said shell comprises a mouth opening in the front portion thereof in alignment with the normal position of the mouth of a fish when a fish is properly positioned in said shell so that the fish can receive water through said mouth opening, said mouth opening extending rearwardly along the bottom portion of said shell a distance sufficient to allow the pectoral fins of said fish to protrude therethrough.

6. The holder of claim 1 and wherein the cavity defined by said shell at the front portion of said shell is enlarged to a width sufficient to allow the gills of a fish properly positioned in said shell to expel water.

7. The holder of claim 1 and wherein said shell defines at least one opening in its lower portion sized and positioned to allow the pelvic fins of a fish properly positioned in said shell to protrude from said shell.

8. The holder of claim 1 and wherein the cavity of said shell includes inwardly facing protrusions at said tail opening for engagement with the body of a fish properly positioned in said shell.

9. The holder of claim 1 and further including hook means connected thereto.

10. The holder of claim 1 and further including buoyant means positioned at the rear side portion of said shell so that the fish holder and a fish positioned therein tend to float in a tilted tail-up attitude.

11. The holder of claim 1 and wherein said shell is transparent and includes opaque areas at the forward position thereof positioned to impede the vision of the fish confined in said holder.

12. The holder of claim 1 and further including worm support means connected to said shell and arranged to support a worm or the like adjacent said shell.

13. A shell for confining live bait comprising a cavity for receiving the forward portion of the body of the bait, a tail opening defined at the rear portion of said shell of a width smaller than the maximum internal width of said cavity so that the tail portion of the bait in said shell normally extends from within said cavity through said tail opening, openings in the lower portion of said shell for receiving the forward appendages of the bait so that the appendages at the forward portion of a properly positioned bait in said shell extend through the openings and tend to hold the bait in said shell, and a plurality of protrusions at the rear portion of each of the sides of said shell positioned forwardly from said tail opening and extending inwardly from the inner surface of said shell for engagement with the scales or the like of the bait to inhibit movement of the bait out of the tail opening of said shell.

14. In combination, a flexible shell defining a cavity therein for receiving the forward portion of live bait, and worm support means connected to said shell and maintaining a worm or the like adjacent said shell in front of the live bait positioned in said shell.

15. A live bait holder comprising flexible shell means for confining only the front portion of the live bait while allowing the rear portion of the bait free movement, and buoyant means connected to one side of said shell to suspend said holder and the bait confined therein in an inclined attitude in the water.

16. A bait holder for live bait comprising a shell defining a cavity which generally conforms in size and shape to the front body portion of the bait and a tail opening at its rear end through which the tail portion of the bait normally protrudes, said shell including means for receiving at least one appendage of the bait to inhibit the bait in the cavity of said shell from moving rearwardly through said tail opening, and a plurality of protrusions projecting inwardly of said shell from the inner surface of said shell at said tail opening and sized and shaped to engage the scales or the like of the bait and inhibit movement of the bait from the cavity of the shell out through the tail opening.

* * * * *